Nov. 26, 1946.  P. F. PARROTT  2,411,803
VEHICLE JACK
Filed June 28, 1945  2 Sheets-Sheet 1
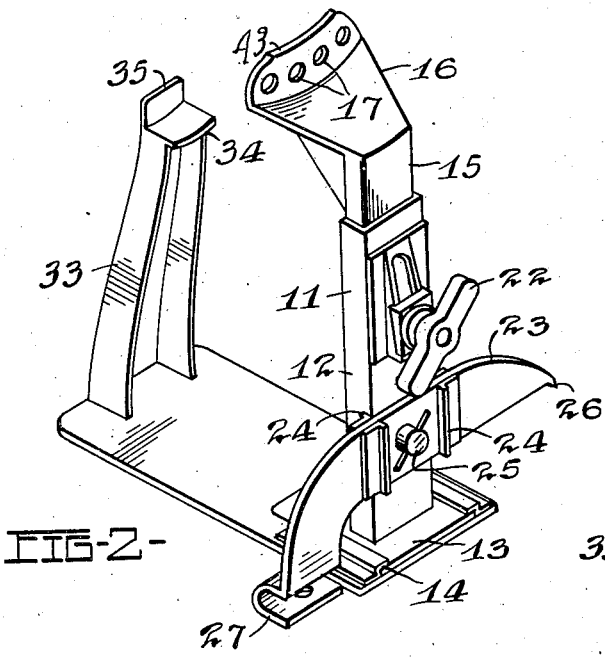
FIG-2-
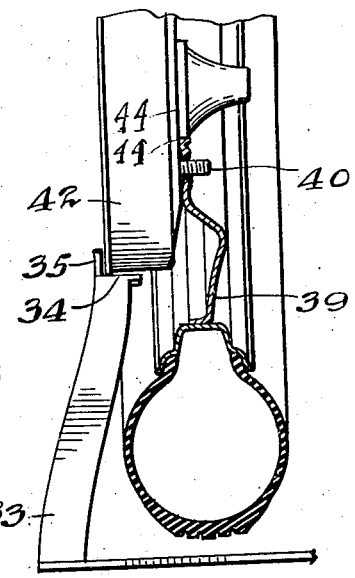
FIG-3-
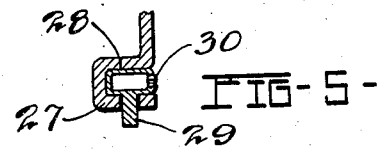
FIG-5-
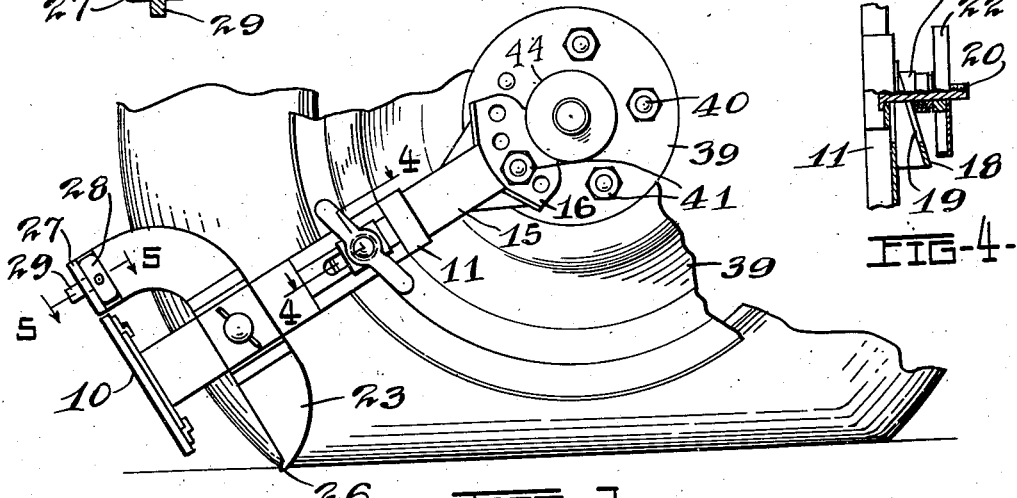
FIG-1-
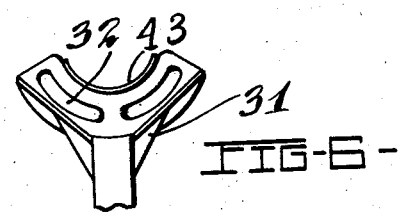
FIG-6-
Inventor
PERCY F. PARROTT
By Owen & Owen
Attorneys Nov. 26, 1946.   P. F. PARROTT   2,411,803
VEHICLE JACK
Filed June 28, 1945   2 Sheets-Sheet 2
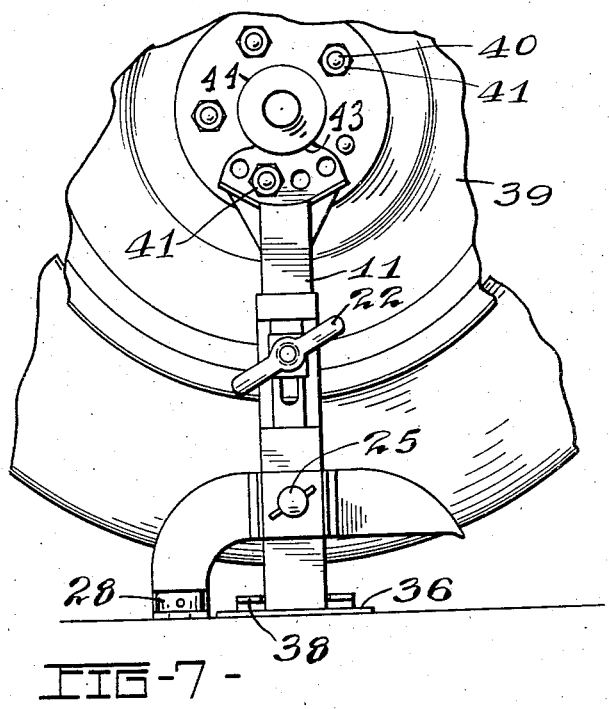
FIG-7-
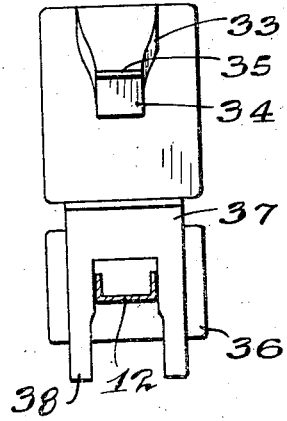
FIG-9-
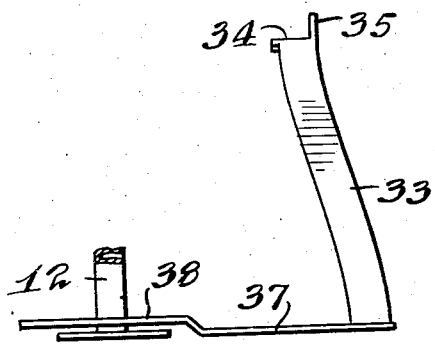
FIG-8-
Inventor
PERCY F. PARROTT
By Owen & Owen
Attorneys.

Patented Nov. 26, 1946

2,411,803

UNITED STATES PATENT OFFICE 2,411,803

VEHICLE JACK

Percy F. Parrott, Toledo, Ohio, assignor, by direct and mesne assignments, to Loretta Parrott Application June 28, 1945, Serial No. 602,015

7 Claims. (Cl. 254—94)

This invention relates to a vehicle jack and more particularly to the type where a strut or elongated member is placed slantingly between the road and a portion of the vehicle and movement of the vehicle straightening the strut lifts the vehicle.

In the particular device which is the subject matter of this invention, the elongated member or strut is provided with a base at one end and means at the other end for interlocking with a wheel of the vehicle so as to rotate with the wheel, with the base extending beyond the periphery of the wheel. The most common reason for employing a jack in connection with a vehicle is for the purpose of changing tires or wheels. When a wheel is elevated by the means just described, the member attached to the wheel interferes with changing the wheel or the tire. In order to avoid this difficulty there is provided a post which may be slipped under another portion of the vehicle, and the elongated member by which the vehicle is lifted is provided with means for adjustably and gradually shortening it so as to lower the vehicle onto the post. Then the original lifting strut can be removed and so will not interfere with changing the tire or wheel. My previous invention, No. 2,279,127, was for the same general type of apparatus, but has no provision for shortening the elevating strut.

One object of the invention is, therefore, to provide a lifting strut with suitable means for shortening it with the weight of the vehicle thereon. Another object of the invention is to provide a means by which the skidding of the base end of the strut is minimized. Another object is to provide means for facilitating the stopping of the vehicle in the elevated position. Another object of the invention is to provide signaling means which will indicate to the driver when the vehicle has reached elevated position. Other details and minor objects of the invention will appear as the description proceeds.

In the accompanying drawings forming a part of this specification,

Fig. 1 shows a front view of the elevating strut or elongated member in position on a wheel for lifting a wheel.

Fig. 2 is an isometric view of the lifting strut and the supporting post connected in operative position for supporting a vehicle.

Fig. 3 is a partial sectional view showing a wheel supported by the supporting post.

Fig. 4 is a detail section on the line 4—4 of Fig. 1 through the adjusting means of the elongated member.

Fig. 5 is a section on the line 5—5 of Fig. 1 through the signaling device.

Fig. 6 is a detail view of a modified form of head for the elongated member or strut.

Fig. 7 is a front view of a slightly modified form of the apparatus in position after a wheel is elevated.

Fig. 8 is a side view of the supporting post with the elongated member broken away.

Fig. 9 is a plan view of the parts shown in Fig. 8.

In the device shown in Fig. 1 there is a flat base plate 10. On one end of this base plate there is mounted an elongated member 11 composed of two longitudinally slidable members. The lower one of these members 12 is provided with a base 13 which slides in a guide-way 14 on base 10. The upper member 15 is provided with a head 16 which has openings 17 adapted to receive one or more bolts which attach a wheel to the vehicle.

As shown most clearly in Fig. 4, member 12 is provided with a wedge 18 through which there is a vertical slot 19 in which there may slide vertically a bolt 20, which passes through a hole in the lower end of member 15 and through a wedge 21 arranged reversely to wedge 19. The outer end of bolt 20 is provided with a manually operable nut 22.

Near the lower end of member 12 there is provided a cross-piece 23 which has flanges or shoulders 24 on both sides adapted to fit against the sides of member 12. A removable pin 25 passes through cross-piece 23 and is threaded into member 12 so that the cross-piece can be removed and turned end for end when desired.

On one end of the cross-piece 23 there is a point 26 adapted to contact the road when the apparatus is in the position shown in Fig. 1, and preventing skidding of the apparatus when the lifting operation is started. The other end of the cross-piece 27 is constructed as a stop member which contacts the road when the elongated member 11 is upright. In the form shown the end 27 is bent to form a pocket in which there fits a bulb 28 having a stem 29 projecting downward for contact with the road. A whistle 30 inserted in the bulb is operated when pin 29 contacts the road.

In the form of head 16 shown in Fig. 1 there are several holes 17, at least one of which is preferably elongated vertically so as to fit different wheels having the attaching bolts at somewhat different distances from the axis. In the form shown in Fig. 6 there is a head 31 provided with slots 32 instead of the series of holes 17.

At the other end of base 10 there is a post 33 having a flange 34 adapted to fit beneath the brake drum of a car. An upwardly extending flange 35 at the side of flange 34 farthest from elongated member 11 acts as a stop when positioning the post against the drum.

In the apparatus shown in Figures 7, 8 and 9, the construction is the same as that disclosed in Figures 1 to 5 inclusive, except that instead of base plate 13 resting upon base 10, there is a base 36 for member 12 which rests directly upon the road. In this form of the device elongated member 11 may be employed alone to lift the wheel. After the vehicle is in the position shown in Fig. 7, the post 33 with its base 37 may be placed in position with its flange 34 beneath the brake drum and with the fork 38 of base 37 straddling member 12 as most clearly seen in Fig. 9.

It will be seen that in the operation of the device a bolt 40 of the wheel 39 is placed through one of the holes 17 and then a nut 41 is replaced upon the bolt. This locks the head 16 firmly to the wheel for rotation therewith. The base of the elongated member extends beyond the perimeter of the wheel so that when the wheel is turned in the appropriate direction the elongated member is turned to vertical position and the wheel is elevated as indicated in Fig. 7. Preferably cross-piece 23 is employed to insure against skidding during the beginning of the elevating operation and to provide a stop and also a signal when the appropriate position has been reached.

When the wheel has been thus elevated, either post 33 is already in position beneath the brake drum 42 as indicated in Fig. 3 or it is then moved into position as will be readily understood from Fig. 9. In either case, in positioning the post it is moved towards member 11 until flange 35 contacts the side of the brake drum.

After the wheel has been elevated and the post is in proper position, nut 22 is released. As the clamp formed by nut 22 and the lower end of member 15 is opened, it slides down on wedge 18. This provides for a gradual and accurately controllable lowering of the wheel until the weight rests upon the post. Thereafter, nut 41 that holds the head in position can be removed and the entire member 11 with its attached cross-piece can be moved away from the wheel so as not to interfere with changing the tire or wheel.

It will be seen that post 33 is curved so that its upper end may be properly positioned under the brake drum while its lower end is clear of even the largest sized tire. At the same time, the post is rigidly attached to a base plate that extends out well beyond a line directly beneath the upper end of the post. Thus the base plate extends materially in every horizontal direction from the vertical that passes through the upper end of the post where the weight of the car rests. This insures stable equilibrium and eliminates any danger of accidental tilting of the post.

The elongated member 11 also has a supporting head offset sufficiently to permit the bottom to clear the tire when the head is clamped to the wheel. Preferably the slidable fit between the base of member 11 and the base of the post is loose enough to permit some tilting of member 11 so that its bottom may be substantially against the tire regardless of differences in sizes of tires, in order that the bottom of member 11 may be as nearly directly beneath its attachment to the wheel as the shape of the wheel and tire will permit.

While the chief use for a jack is to support the vehicle while a tire or wheel is being changed, it will be readily seen that my device could be employed to lift a wheel out of the mud or snow, or for any other purpose where it is desirable to lift the wheel while the vehicle is being moved forward or backward.

Cross-piece 23 might be permanently attached to member 12, since ordinarily the device could be used on any wheel on either side of the vehicle by moving the vehicle forward or back in the proper direction to utilize point 26. But there are some situations in which it is more convenient to move the vehicle in one direction than the other, and the detachable and reversible cross-piece makes its use convenient in all situations.

While one form of the apparatus has been shown and described in considerable detail, and one or two minor modifications have been indicated, it will be readily understood that other changes may be made within the scope of the appended claims while retaining some of the benefits of the invention.

It will be understood that the head of the strut may be interlocked with the wheel by any suitable means. In the construction shown, the head is provided with an arcuate shoulder 43 adapted to fit the axle housing or trim 44, coaxial with the wheel so that suitable interlock may be made by this fit and one bolt, and this construction is simple and that considered best. However, obviously the interlock could be effected by means shown in my above cited patent, by extending the head so it was secured in place by two or more bolts, or by any other suitable means.

What I claim is:

1. A device for elevating a vehicle, comprising an elongated member, a road-engaging base at one end of the member, means at the other end of the member for interlocking with a wheel of a vehicle for rotation therewith, with the base extending beyond the periphery of the wheel, means for adjustably and gradually shortening said member while the vehicle is elevated thereby, and a supporting post on said base in position to engage and support a portion of the vehicle when said member is shortened.

2. A device for elevating a vehicle, comprising an elongated member, a road-engaging base at one end of the member, means at the other end of the member for interlocking with a wheel of a vehicle for rotation therewith, with the base extending beyond the periphery of the wheel, means for adjustably and gradually shortening said member while the vehicle is elevated thereby, and a supporting post on said base in position to engage and support a portion of the vehicle when said member is shortened, said member being slidably connected to said base whereby it may be removed after being shortened to rest the vehicle on the post.

3. A device for elevating a vehicle comprising an elongated member, a road-engaging base at one end of the member, means at the other end of the member for interlocking with a wheel of a vehicle for rotation therewith, with the base extending beyond the periphery of the wheel, means for adjustably and gradually shortening said member while the vehicle is elevated thereby, and a supporting post on said base in position to engage and support a portion of the vehicle when said member is shortened, said member and said post having bases with inter-engaging means for relatively positioning the member and post.

4. A device for elevating a vehicle comprising an elongated member having a base at one end and means at the other end for interlocking with a wheel of a vehicle for rotation therewith, with the base beyond the periphery of the wheel, and a cross-piece on said member having a road-engaging anti-skid point at one end and a road-engaging stop at the other end, and a signaling device in said stop.

5. A device for elevating a vehicle comprising an elongated member having a base at one end and means at the other end for interlocking with a wheel of a vehicle for rotation therewith, with the base beyond the periphery of the wheel, and a cross-piece on said member having a road-engaging anti-skid point at one end and a road-engaging stop at the other end, said cross-piece being attachable reversibly to enable the anti-skid point to project in either direction.

6. A device for elevating a vehicle, comprising an elongated member, a road-engaging base at one end of the member, means at the other end of the member for interlocking with a wheel of a vehicle for rotation therewith, with the base extending beyond the periphery of the wheel, and means for adjustably and gradually shortening said member while the vehicle is elevated thereby, the last said means comprising a longitudinally slidable connection between end portions of said member, a wedge on the lower of said portions, a clamp on the upper of said portions fitting over the wedge, and manual means for adjusting the clamp.

7. In apparatus for elevating and supporting a vehicle having wheels detachably secured to the vehicle by a series of bolts around the center of the wheel and a brake drum adjacent one side of and co-axial with the wheel, an elongated member having a base at one end and a head at the other end, the head being provided with an opening adapted to fit over and be clamped by one of said bolts for rotation with the wheel with the base extending beyond the periphery of the wheel, means for adjustably and gradually shortening the member while the base is vertically beneath the head, a supporting post having a base at one end and a flange at the other end adapted to support the brake drum, and a vertical flange at the side of the first said flange adapted to engage the drum on its side farthest from the wheel, the base of said elongated member and the base of said post having interfitting parts allowing sliding movement of said bases in a direction parallel with the axis of the wheel and drum.

PERCY F. PARROTT.